Patented Aug. 10, 1954

2,686,186

UNITED STATES PATENT OFFICE 2,686,186

AMINOPROPYL-2-THIENYL-CYCLO-ALKENYL ACETATE

Frederick Leonard, Jackson Heights, N. Y., assignor to Warner-Hudnut, Inc., New York, N. Y., a corporation of Delaware No Drawing. Application July 21, 1951, Serial No. 238,028

1 Claim. (Cl. 260—332.2)

This invention relates to new compounds of pharmaceutical value, particularly as antispasmodics. This application is a continuation-in-part of my prior filed application, Serial No. 119,197, filed October 1, 1949, now Patent No. 2,561,385.

My prior application, Serial No. 119,197, discloses and claims compounds having the structural formula

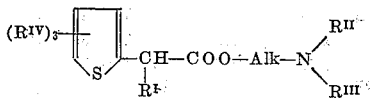

in which $R^I$ denotes a cyclohexenyl or cyclopentenyl radical; $R^{II}$ and $R^{III}$, which may be the same or different, denote alkyl radicals containing not over 4 carbon atoms or together denote either a polymethylene radical containing not over 5 carbon atoms or a polymethylene radical containing not over 4 carbon atoms interrupted by an oxygen, sulfur or imino group; $R^{IV}$ denotes hydrogen, short chain alkyl radicals or halogens, which may be the same or different; and $Alk$ denotes an alkylene radical containing not over 6 carbon atoms. This class of compounds has been found to be highly effective antispasmodics, possessing the unusual property of having high neurotropic and musculotropic activity.

Further investigation has now established that a particular limited group of compounds within the class set forth in my prior application, namely compounds in which $Alk$ in the above formula represents a trimethylene radical, possess surprisingly high neurotropic and musculotropic activity even as compared with the class set forth in my said application. Accordingly, this application is directed specifically to compounds having the formula

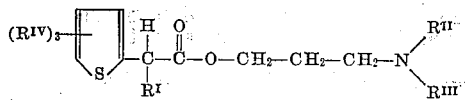

wherein $R^I$ denotes a cyclohexenyl or cyclopentenyl radical; $R^{II}$ and $R^{III}$, which may the same or different, denote alkyl radicals containing not over 4 carbon atoms, or together denote either a polymethylene radical containing not over 5 carbon atoms, or a polymethylene radical containing not over 4 carbon atoms interrupted by an oxygen, sulfur or imino group; and $R^{IV}$ denotes hydrogen, a short chain alkyl radical or halogen, which members may be the same or different.

The compounds of this invention may be readily prepared by reacting a compound of the formula

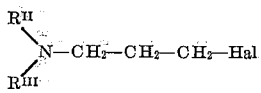

wherein $R^{II}$ and $R^{III}$ are as above defined and $Hal$ denotes halogen, with a compound of the formula

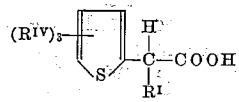

wherein $R^I$ and $R^{IV}$ are as above defined, or with an alkali salt thereof; this reaction may be carried out readily under reflux in a suitable solvent such as absolute ethyl acetate. My compounds may also be prepared by reacting under reflux and in a suitable solvent a compound of the formula

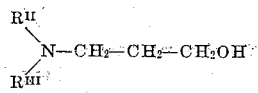

with an acyl halide of the substituted thienylacetic acids above described. Another suitable method involves reacting a lower alkyl, e. g. methyl or ethyl ester of the thienylacetic acids above described with a dialkylaminopropanol above set forth under conditions accomplishing ester interchange and volatilization of the lower alcohol, e. g. by heating the reactants in a solvent such as xylene at reflux temperatures. The thienylacetyl chlorides from which the compounds of my invention may be prepared are conveniently obtained by treatment of the corresponding alpha-substituted thienylacetic acids with excess thionyl chloride under reflux in a suitable solvent such as dry benzene.

The free basic esters of my invention are water-insoluble liquids. Water-soluble salts may be formed by treating the free bases with acids such as hydrochloric acid, hydrobromic acid, sulfuric acid, tartaric acid, citric acid or succinic acid, or with suitable organic halides, e. g., alkyl halides such as methyl chloride or methyl bromide, aralkyl halides such as benzyl chloride or benzyl bromide or other organic halides such as thienylmethyl chloride.

Among the compounds which may be prepared in accordance with this invention are the following: 3-diethylaminopropyl alpha-($\Delta^2$-cyclohexenyl) - 2 - thienylacetate; 3 - diethylaminopropyl alpha - ($\Delta^2$ - cyclopentenyl) - 2 - thienylacetate; 3-(1-piperidyl)-propyl alpha-($\Delta^2$-cyclopentenyl) - 2 - thienylacetate; 3 - (1 - piperidyl)-propyl alpha - ($\Delta^2$ - cyclohexenyl) - 2 - thienylacetate; 3-dipropylaminopropyl alpha-($\Delta^2$-cyclohexenyl)-2-thienylacetate; 3-dipropylaminopropyl alpha - ($\Delta^2$ - cyclopentenyl) - 2 - thienylacetate; 3-dibutylaminopropyl alpha-($\Delta^2$-cyclohexenyl)-2-thienylacetate; 3-dibutylaminopropyl alpha-($\Delta^2$-cyclopentenyl)-2-thienylacetate; 3-di(isopropylamino)propyl alpha - ($\Delta^2$ - cyclohexenyl)-2-thienylacetate; 3-(1-pyrrolidyl)-propyl alpha - ($\Delta^2$ - cyclohexenyl) - 2 - thienylacetate; 3 - (1 - pyrrolidyl) - propyl alpha - ($\Delta^2$ - cyclopentenyl) - 2 - thienylacetate; 3 - (4 - morpholinyl) - propyl alpha - ($\Delta^2$ - cyclohexenyl) - 2 - thienylacetate; 3 - (4 - morpholinyl) - propyl alpha - ($\Delta^2$ - cyclopentenyl) - 2 - thienylacetate; 3 - (4 - thiomorpholinyl) - propyl alpha - ($\Delta^2$-cyclohexenyl) - 2 - thienylacetate; 3 - (1 - piperazinyl) - propyl alpha - ($\Delta^2$ - cyclohexenyl - 2-thienylacetate; 3-(1-piperazinyl)-propyl alpha-($\Delta^2$-cyclopentenyl)-2-thienylacetate; 3-diethylaminopropyl alpha-($\Delta^2$-cyclohexenyl)-3-methyl-2-thienylacetate; 3-diethylaminopropyl alpha-($\Delta^2$ - cyclopentenyl) - 4 - chloro - 2 - thienylacetate; 3-dimethylaminopropyl alpha-($\Delta^2$-cyclohexenyl)-2-thienylacetate; as well as water-soluble salts of these basic esters obtained by reacting these bases with acids and with alkyl halides in accordance with the foregoing disclosure. The preferred compound of this invention is the compound 3-diethylaminopropyl alpha-($\Delta^2$-cyclohexenyl)-2-thienylacetate, which has been found to have optimum antispasmodic action.

In order to demonstrate the extremely high antispasmodic activity possessed by the compounds of this invention, the following table is given in which the preferred compound of this invention, namely 3-diethylaminopropyl alpha-($\Delta^2$-cyclohexenyl)-2-thienylacetate, in the form of its hydrochloride (designated compound 1), is compared with the preferred compound of my prior filed application above identified, namely the compound 2 - diethylaminoethyl alpha - ($\Delta^2$-cyclopentenyl)-2-thienylacetate, in the form of its hydrochloride (designated compound 2). In these tests antispasmodic neurotropic activity was determined by suspending a strip of guinea pig intestine in a bath of oxygenated Locke's solution maintained at body temperature, inducing spasm in the strip by addition of an aqueous solution of acetylcholine in a concentration of one part per million and then determining the quantity of compound being tested required to prevent development of spasm induced in this manner. Musculotropic activity was determined in the same manner, except that barium chloride in a concentration of one part per five thousand was used to induce spasm. The results of these tests are indicated below.

| Compound Tested | Activity, γ/cc. of bath | |
|---|---|---|
| | Neurotropic Activity | Musculotropic Activity |
| 1 | 0.01-0.02 | 3 |
| 2 | 0.05-0.10 | 9 |

It is evident, therefore, that the compounds of this invention possess considerably higher antispasmodic activity than the preferred compound of my prior filed application.

In addition, it has also been found that the preferred compound of this invention exhibits approximately twice the antidotal effect against bronchial spasm induced by administration of neostigmine methylsulfate as does the preferred compound of my prior filed application, as well as possessing twice the antihistaminic activity as compared with the preferred compound of said prior filed application.

The following example is illustrative of my invention:

*Example*

A mixture of 11.1 gms. (0.05 mole) of alpha-($\Delta^2$-cyclohexenyl)-2 - thienylacetic acid, 6.8 gms. (0.05 mole) of 3-diethylaminopropyl chloride, 7.6 gms. (0.055 mole) of anhydrous potassium carbonate, and 45 cc. of absolute ethyl acetate was refluxed for 9.75 hours. At the end of this time, the reaction mixture was filtered and the filtrate was concentrated under vacuum. The residue was extracted with ether, the ether extracts concentrated in vacuo and the residue distilled at less than one micron pressure. 12.36 gms. of free base B. P. 105°–134° C., $n_D^{20}$ 1.5179, were obtained.

This material was dissolved in 60 cc. of ethyl acetate and treated with the stoichiometric amount of 4.92N ethanolic HCl. Ether was then added to the solution to the appearance of a permanent turbidity, whereupon the hydrochloride crystallized on cooling. It was filtered off, washed first with 1:1 ethyl acetate-ether, then with ether, and dried. Recrystallization from a solution of 3 cc. of ethanol and 160 cc. of ethyl actate gave 10.27 gms. of the desired 3-diethylaminopropyl alpha-($\Delta^2$-cyclohexenyl) - 2-thienylactate hydrochloride, M. P. 138°–139° C. Analysis gave the following results:

Calculated for $C_{19}H_{30}ClNO_2S$: C=61.34, H=8.13, Cl=9.53. Found: C=61.19, H=7.92, Cl=9.60.

By substituting for the alpha - ($\Delta^2$ - cyclohexenyl) - 2 - thienylacetic acid employed in the above example an equivalent amount of alpha-($\Delta^2$ - cyclopentenyl)-2 - thienylacetic acid, the compound 3 - diethylaminopropyl alpha - ($\Delta^2$-cyclopentenyl) - 2 - thienylacetate hydrochloride was obtained. Likewise, by substituting for 3-diethylaminopropyl chloride in either of the above examples an equivalent amount of 3-(1-piperidyl)-propyl chloride corresponding esters of 3-(1-piperidyl)-propanol were obtained.

Since certain changes may be made in the compounds above described without departing from the scope of my invention, it is intended that all matter contained in the above description shall be interpreted as illustrative, and not in a limiting sense.

I claim:

The compound 3 - diethylaminopropyl alpha ($\Delta^2$-cyclohexenyl)-2-thienylacetate.

References Cited in the file of this patent

UNITED STATES PATENTS

| Number | Name | Date |
|---|---|---|
| 2,538,794 | Moffett | Jan. 23, 1951 |
| 2,541,634 | Blicke | Feb. 13, 1951 |
| 2,561,385 | Leonard | July 24, 1951 |

FOREIGN PATENTS

| Number | Country | Date |
|---|---|---|
| 625,811 | Great Britain | July 5, 1949 |